United States Patent
Hansen et al.

(10) Patent No.: US 11,424,457 B2
(45) Date of Patent: Aug. 23, 2022

(54) METHOD FOR PRODUCING A GAS DIFFUSION ELECTRODE AND GAS DIFFUSION ELECTRODE

(71) Applicant: Siemens Energy Global GmbH & Co. KG, Munich (DE)

(72) Inventors: Martin Kalmar Hansen, Vanløse (DK); Kasper Tipsmark Therkildsen, Lille-Skensved (DK)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 207 days.

(21) Appl. No.: 16/625,650

(22) PCT Filed: Jun. 23, 2017

(86) PCT No.: PCT/EP2017/065524
§ 371 (c)(1),
(2) Date: Dec. 20, 2019

(87) PCT Pub. No.: WO2018/233843
PCT Pub. Date: Dec. 27, 2018

(65) Prior Publication Data
US 2021/0159508 A1    May 27, 2021

(51) Int. Cl.
*H01M 4/88* (2006.01)
*H01M 4/86* (2006.01)
*H01M 8/0239* (2016.01)
*H01M 8/0245* (2016.01)

(52) U.S. Cl.
CPC ....... *H01M 4/8807* (2013.01); *H01M 4/8605* (2013.01); *H01M 4/8896* (2013.01); *H01M 8/0239* (2013.01); *H01M 8/0245* (2013.01)

(58) Field of Classification Search
None
See application file for complete search history.

(56) References Cited

U.S. PATENT DOCUMENTS

| 3,553,032 | A | 1/1971 | Baba et al. | 264/109 |
| 5,618,392 | A * | 4/1997 | Furuya | H01M 8/08 204/252 |
| 5,863,673 | A | 1/1999 | Campbell et al. | 429/44 |
| 5,998,057 | A | 12/1999 | Koschany et al. | 429/42 |
| 7,993,499 | B2 | 8/2011 | Zuber et al. | 204/252 |

(Continued)

FOREIGN PATENT DOCUMENTS

| CN | 1180249 A | 4/1998 | H01M 4/86 |
| CN | 1853301 A | 10/2006 | C25B 1/10 |

(Continued)

OTHER PUBLICATIONS

Chinese Office Action, Application No. 201780092420.9, 18 pages.
International Search Report and Written Opinion, Application No. PCT/EP2017/065524, 14 pages, dated Aug. 23, 2017.

*Primary Examiner* — Haroon S. Sheikh
(74) *Attorney, Agent, or Firm* — Slayden Grubert Beard PLLC

(57) ABSTRACT

Various embodiments include a method for producing a gas diffusion electrode, the method comprising: providing a raw electrode layer comprising an electrically non-conducting web; adapting a thickness of the raw electrode layer; and applying a non-solvent to the raw electrode layer.

10 Claims, 2 Drawing Sheets

(56) References Cited

U.S. PATENT DOCUMENTS

| | | | | |
|---|---|---|---|---|
| 2007/0134530 A1* | 6/2007 | Nakamura | ............ | H01M 8/1027 |
| | | | | 429/493 |
| 2007/0154778 A1 | 7/2007 | Haufe et al. | .................... | 429/42 |
| 2011/0143262 A1* | 6/2011 | Fultz | ................... | H01M 8/0239 |
| | | | | 429/513 |
| 2013/0101906 A1* | 4/2013 | Alvarez Gallego | ........................ | |
| | | | | H01M 4/8807 |
| | | | | 429/401 |

FOREIGN PATENT DOCUMENTS

| | | | | |
|---|---|---|---|---|
| CN | 101330147 A | 12/2008 | .............. | D01F 9/22 |
| CN | 102142572 A | 8/2011 | ............ | H01M 4/86 |
| DE | 20 2005 010 403 U1 | 11/2005 | .............. | H01M 4/62 |
| GB | 2 316 802 A | 3/1998 | .............. | H01M 4/86 |
| GB | 2316802 A * | 3/1998 | .......... | H01M 4/8605 |
| WO | 97/20358 A1 | 6/1997 | ............ | C25B 11/03 |
| WO | 2018/233843 A1 | 12/2018 | ............ | C25B 11/03 |

\* cited by examiner

METHOD FOR PRODUCING A GAS DIFFUSION ELECTRODE AND GAS DIFFUSION ELECTRODE

CROSS-REFERENCE TO RELATED APPLICATIONS

This application is a U.S. National Stage Application of International Application No. PCT/EP2017/065524 filed Jun. 23, 2017, the contents of which are hereby incorporated by reference in their entirety.

TECHNICAL FIELD

The present disclosure relates to electrodes. Various embodiments include methods for producing gas diffusion electrodes and/or gas diffusion electrodes.

BACKGROUND

Electrochemical conversion processes such as electrolysis are used for various purposes. For example, Hydrogen and/or Oxygen can be generated by hydrogen evolution reaction (HER) and Oxygen evolution reaction (OER) in an electrolyser by electrolysis of electrolyte, i.e. generally water. Another example for an electrochemical conversion process is, for instance, an electrochemical reduction of carbon dioxide. The electrochemical conversion devices, for example an electrolyser, in which such electrochemical conversion processes are performed, include electrodes which are referred to as gas diffusion electrodes. These electrodes conduct electrical energy to the electrolyte and decompose the electrolyte and/or further reactants to generate the desired products such as oxygen gas, hydrogen gas, etc.

Another important component used in such electrochemical conversion processes is a gas-tight membrane or a diaphragm which is referred to a gas separator diaphragm or simply a gas separator. This component divides the electrochemical conversion device into chambers or compartments and allows a flow of ions from one such chamber to another but does not allow the flow of gases such as oxygen or hydrogen from one chamber to another. In this way the products of the electrochemical conversions are separated. The electrochemical cell components, i.e. the gas separator diaphragms and/or the gas diffusion electrodes are presently manufactured by using batch manufacturing.

U.S. Pat. No. 3,553,032 A1 describes a method of making a fuel cell electrode comprising a porous bounded matrix of water repealing polymer particles having a thin coating of silver and particles of an electrical conductive material interspersed therein and adhere to the matrix which comprises forming a mixture of a water repellent polymer, particles of an electrically conductive material and particles of silver carbonate, molding the mixture under pressure to form a coherent structure and heating and the resulting coherent structure to a temperature above the decomposition temperature of the silver carbonate but below the softening point of the polymer to thereby form silver and liberate carbon dioxide gas which diffuses through a structure to render in substantially porous.

SUMMARY

The present disclosure describes efficient processes for making gas diffusion electrodes, which can produce gas diffusion electrodes in a high quality by low production costs. Some embodiments include a continuous process of producing gas diffusion electrodes while still maintaining the important parameters of the gas diffusion electrodes, such as porosity, hydrophobicity, and catalytic performance. Some embodiments include a simple process of producing gas diffusion electrodes which leads to thin gas diffusion electrodes having a high quality. For example, some embodiments include a method for producing a gas diffusion electrode, comprising the steps of: providing (S1) a raw electrode layer (100) comprising an electrically non-conducting web (110); adapting (S2) a thickness of the raw electrode layer (100); and applying (S3) a non-solvent to the raw electrode layer (100).

In some embodiments, the electrically non-conducting web (110) comprises an organic polymer.

In some embodiments, a thickness of the electrically non-conducting web (110) is less than 149 micrometer.

In some embodiments, the raw electrode layer (100) comprises at least one layer (21) including particles of an electrode material and a binder.

In some embodiments, applying (S2) a non-solvent to the raw electrode layer (100) comprises applying a first non-solvent in a closed volume steam and/or spaying the first non-solvent on a surface of the raw-electrode layer (100).

In some embodiments, applying a non-solvent to the raw electrode layer (100) comprises applying a second non-solvent in a non-solvent bath.

In some embodiments, providing (1) a raw electrode layer comprises: providing a first raw electrode layer and a second raw electrode layer; and pressing together the first raw electrode layer and the second raw electrode layer.

In some embodiments, the first raw electrode layer and the second raw electrode layer each comprise an electrically non-conducting web (110).

In some embodiments, a physical barrier (35) is placed in front of a surface of the raw electrode layer (100) before applying the non-solvent to the raw electrode layer (100).

In some embodiments, a method includes controlling a distance between the physical barrier (35) and the surface of the raw electrode layer (100).

In some embodiments, the raw electrode layer (100) is feed vertically when applying (S2) the non-solvent to the raw electrode layer (100).

As another example, some embodiments include a gas diffusion electrode (200,300) comprising an electrically non-conducting reinforcement web (110).

In some embodiments, a thickness of the electrically non-conducting reinforcement web (110) is less than 149 micrometer.

In some embodiments, the gas diffusion electrode (300) comprises at least two layers (310,320), each layer (310, 320) comprising an electrically non-conducting reinforcement web (110).

In some embodiments, the gas diffusion electrode (200, 300) has a non-symmetric cross section.

BRIEF DESCRIPTION OF THE DRAWINGS

The teachings of the present disclosure are further described hereinafter with reference to illustrate embodiments shown in accompanying drawings, in which.

DETAILED DESCRIPTION

Figure 1:
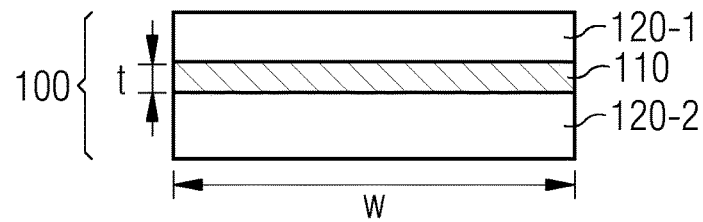
FIG. 1: schematically shows a cross-section of a raw electrode layer incorporating teachings of the present disclosure.

Some embodiments include a method for producing a gas diffusion electrode comprising providing a raw electrode layer, wherein the raw electrode layer comprises an electrically non-conducting web. Further, the method comprises the steps of adapting a thickness of the raw electrode layer and applying a non-solvent to the raw electrode layer.

Some embodiments include a gas diffusion electrode comprising an electrically non-conducting reinforcement web.

In some embodiments, by using electrically non-conductive reinforcement webs for producing gas diffusion electrodes, a simple production of such gas diffusion electrodes can be achieved, and at the same time the thickness of the gas diffusion electrodes can be reduced. In this way a simple production of robust and thin gas diffusion electrodes can be achieved and at the same time the production costs for such gas diffusion electrodes can be reduced.

By producing gas diffusion electrodes using a reinforcement web, it is possible to realize a continuous process for producing gas diffusion electrodes. For instance, the reinforcement web can be casted with a suspension of particles in a solution of a binder. Depending on the desired properties of the layer, the suspension may comprise electrically conductive particles or particles of a hydrophobic material. The raw electrode layer may be subjected to phase inversion thereby realizing porosity. It is even possible to cast a further suspension to the first suspension on the raw electrode layer, or to apply different suspensions to different sites of the reinforcement web before subjecting the raw electrode to phase inversion.

This process of casting the reinforcement web with one or more suspensions and subjecting phase inversion by applying one or more non-solvents to the raw electrode layer can be performed in a continuous process, the gas diffusion electrodes can be produced in a simple production process requiring low costs. At the same time, high quality cast diffusion electrodes can be achieved. By the use electrically non-conductive reinforcement webs, the stability of the reinforcement web is high, even if the thickness of the reinforcement web is very low. In this way, reinforcement webs having only a very small thickness, for instance a few micrometers, for instance, 10, 20, 50, 100 or 140 micrometers can be used for a production process of gas diffusion electrodes.

In some embodiments, the electrically non-conducting web comprises an organic polymer. For instance, the electrically non-conducting reinforcement web may comprise polypropylene (PP) or polyphenylene sulfide (PPS). However, any other appropriate polymer will be used, too. For instance, nylon or another appropriate organic polymer may be also used as reinforcement web. In this way, reinforcement webs having a very small thickness of only a few micrometers, in particular 10, 20, 50, 100 or 150 micrometers may be used as reinforcement web. The reinforcement web may have any appropriate width. For instance, the reinforcement web may have a width of about one or a few centimeters. The width may also have a few ten centimeters up to 100 centimeter or more. Accordingly, the resulting size of the gas diffusion electrode is only limited by the size of the reinforcement web on which the particles of the gas diffusion electrodes are casted. Furthermore, the length of the reinforcement web and consequently of the raw electrode layer may have a few meters up to many meters.

In some embodiments, the thickness of the reinforcement web, in particular the thickness of the electrically non-conducting web is less than 150 micrometer, in particular less than 149 micrometer. In some embodiments, the thickness of the electrically non-conducting reinforcement web is less than 100 micrometer, in particular less than 50 micrometer or even less than 20 micrometer or less than 10 micrometer. In this way, the thickness of the resulting gas diffusion electrode can be minimized.

In some embodiments, several electrode layer comprises at least one layer including particles of an electrode material and a binder. For instance, the raw electrode layer may comprise particles of an electrically conductive material and a binder. In this way, an electrochemically active layer can be achieved. In some embodiments, the raw electrode layer may comprise a layer comprising particles of a hydrophobic material and a second binder. Furthermore, particles of any other appropriate material may be also casted on the electrically non-conducting web.

In some embodiments, the step of applying a non-solvent to the raw electrode layer comprises applying a first non-solvent in a closed volume steam and/or spraying the first non-solvent on a surface of the raw electrode layer. In this way, phase inversion is subjected to the raw electrode layer and thereby porosity of the gas diffusion electrode can be achieved.

In some embodiments, applying a non-solvent to a raw electrode layer comprises applying a second non-solvent in non-solvent bath. Optionally, further tasks for applying further non-solvents may be also applied to the raw electrode layer in order to perform a phase inversion and to realize porosity in the electrode layer.

In some embodiments, providing a raw electrode layer comprises providing a first raw electrode layer and a second raw electrode layer. In this case, the first electrode layer and the second raw electrode layer are pressed together. Thus, the first raw electrode layer and the second raw electrode layer can be combined to a common raw electrode layer and the successive steps are applied to the combination of the first and the second raw electrode layer. Accordingly, the first and the second raw electrode layer may have different properties, in particular the first raw electrode layer and the second raw electrode layer may comprise particles of different materials. Hence, a sandwich structure of two or even more layers can be achieved.

In some embodiments, both the first raw electrode layer and the second raw electrode layer each comprise an electrically non-conducting web. In particular, the electrically non-conducting webs of the first and the second raw electrode layer both may be webs of an organic polymer and may have a thickness of less than 149 micrometers.

In some embodiments, a physical barrier is placed in front of a surface of the raw electrode layer before applying the non-solvent to the raw electrode layer. In this way, the physical barrier can limit or prevent applying the non-solvent on the respective surface of the raw electrode layer. Accordingly, the impact of the non-solvent to the respective surface is limited and consequently a non-symmetric cross-section of the gas diffusion electrode can be achieved.

In some embodiments, the method comprises controlling a distance between the physical barrier and the surface of the raw electrode layer. By adapting the distance between the physical barrier and the surface of the raw electrode layer, the impact of the non-solvent can be controlled and consequently the properties of the respective side of the electrode layer facing to the physical barrier can be influenced.

In some embodiments, the raw electrode layer is feed vertically when applying the non-solvent to the raw electrode layer. In this way, the phase inversion by applying the non-solvent can be performed in a very efficient way.

In some embodiments, the thickness of the electrically non-conducting reinforcement web is less than 149 micrometers. In particular, the thickness of the reinforcement web is less than 140 micrometers, or even less than 120 micrometers or less than 100 micrometers. In particular, the thickness of the electrically non-conducting reinforcement web may be even less than 50 micrometers or less than 20 micrometers or even less than 10 micrometers.

In some embodiments, the gas diffusion electrode comprises at least two layers. In this case, each layer comprises a separate electrically non-conducting reinforcement web having the above-mentioned properties.

In some embodiments, the gas diffusion electrode has a non-symmetric cross-section. Accordingly, different sides of the gas diffusion electrode have different properties.

In some embodiments, the electrically non-conducting reinforcement web comprises an organic polymer. For instance, the organic polymer may comprise polypropylene (PP), polyphenylene sulfide (PPS) or nylon. However, any other appropriate polymer may be also used for producing the reinforcement web.

Hereinafter, above-mentioned and other features of the present invention are described in detail. Various embodiments are described with reference to the drawings, wherein reference numerals are used to refer to like embodiments throughout. In the following description, for purpose of explanation, numerous specific details are set forth in order to provide an understanding of one or more embodiments. It may be noted that the illustrated embodiments are intended to explain, and not to limit the scope of the disclosure. It may be evident that such embodiments may be practiced without these specific details.

FIG. 1 shows a cross-section of a raw electrode layer 100 which can be used as a raw electrode layer for producing a gas diffusion electrode. The raw electrode layer comprises a web 110. This web 110 may serve as a reinforcement web. In this way, a desired stability of the raw electrode layer 100 and the resulting gas diffusion electrode can be achieved. In particular, the web 110 is made by a porous electrically non-conductive material. For example, such a porous electrically non-conductive web 110 may be realized by a web comprising polypropylene (PP), polyphenylene sulfide (PPS), nylon, or another appropriate polymer. For instance, the web 110 can be realized by a mesh comprising a polymer such as the above-mentioned polymers or another appropriate organic polymer. In this way, a strong and tough web 110 can be realized which can serve as a reinforcement web for the raw electrode layer 100 and the resulting gas diffusion electrode. Due to the robustness of such an electrically non-conductive web 110, in particular a mesh of an organic polymer, a very thin and strong reinforcement web 110 can be achieved. For instance, a desired robustness of the reinforcement web 110 can be achieved even if the thickness t is less than 200 micrometers, or even less than 150 micrometers, 149 micrometers, less than 100 micrometers or less than 50 micrometers. Even reinforcement webs having a thickness of 20 micrometers or less, for instance 10 micrometers can be realized. In contrast to this, electrically conducting reinforcement webs on a basis of a metallic mesh usually have a significant higher thickness in order to achieve the desired robustness.

The reinforcement web 110 may be casted with a suspension 120-$i$. This suspension 120-$i$ may comprise particles and a binder. Depending on the selected particles in the suspension, the properties of the resulting gas diffusion electrode can be adapted. The suspension 120-$i$ may be casted at least on one side of the reinforcement web 110. However, the suspension 120 may be also casted on both sides of the reinforcement web 110. Furthermore, it is possible to cast different suspensions on the reinforcement web 110. For instance, a first suspension 120-1 comprising a first kind of particles may be casted on one side of the reinforcement web; and a second suspension 120-2 comprising second particles may be casted on the other side of the reinforcement web 110.

Furthermore, it may be also possible to cast multiple layers on one side or at least on one side of the reinforcement web 110. For instance, a first layer of a first suspension may be casted directly on a surface of the reinforcement web, and subsequently a second suspension comprising a second kind of particles may be casted on the layer of the first suspension.

The width w of the raw electrode layer 100 is only limited by the width of the reinforcement web 110 on which the suspension is casted. For instance, the reinforcement web or the resulting raw electrode layer 100 may have a width w of at least 5 centimeters, 10 centimeters, 20 centimeters, 50 centimeters, 1 meter or more. Furthermore, the length of the raw electrode layer 110 may be many meters. For instance, the raw electrode layer may have a length of 5 meters, 10 meters, 50 meters, 100 meters, or even more.

Figure 2:
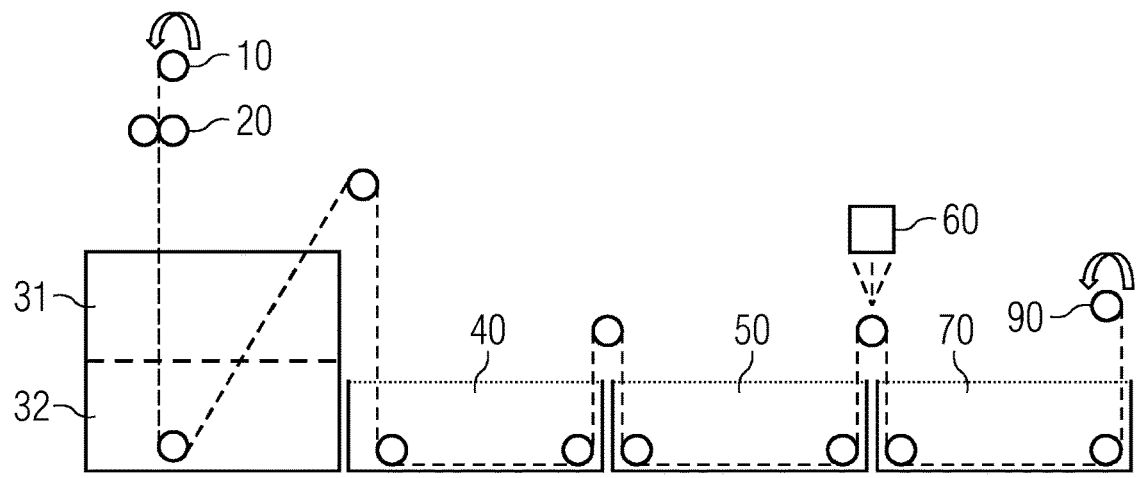
FIG. 2: schematically shows a process for producing a gas diffusion electrode incorporating teachings of the present disclosure.

FIG. 2 shows a schematic diagram of a process for producing a gas diffusion electrode incorporating teachings of the present disclosure. First, at least one raw electrode layer 100 is provided. For instance, at position 10 a role of already prepared raw electrode layer 110 can be provided. In some embodiments, it is possible to provide only a reinforcement web 110 and to subsequently cast one or more layers of an appropriate suspension on the provided reinforcement web 110. After providing the raw electrode layer 110, at a position 20 the thickness of the raw electrode layer may be adapted. For instance, the thickness of the raw electrode layer may be set by feeding the raw electrode layer 100 to two roles having a predetermined distance. In this way, the thickness of the raw electrode layer 100 may be adapted according to the distance between the two roles. In some embodiments, the raw electrode layer may be also feed through a slit having a predetermined width. Furthermore, any other appropriate configuration for adapting the thickness of the raw electrode layer 100 may be also possible.

After the thickness of the raw electrode layer 100 is adapted accordingly, a non-solvent is applied to the raw electrode layer 100. In this way, a phase inversion can be performed and thereby a porosity of the suspension 120-$i$ on the reinforcement web 110 can be realized. For instance, at least one or two non-solvents may be applied to the raw electrode layer in order to perform a phase inversion. As can be seen in FIG. 2, a first non-solvent may be applied to the raw electrode layer 100 at position 31. For instance, this first non-solvent could be a closed volume of an appropriate steam or a liquid which is finally sprayed on the raw electrode layer. Furthermore, at position 32 a non-solvent bath comprising a non-solvent in a liquid form may be applied to the raw electrode layer. The non-solvent could be, for instance water or an appropriate organic solvent or a mixture thereof. Since appropriate non-solvents for performing a phase inversion are already well-known, these solvents are not discussed in more detail herein.

In some embodiments, further extra non-solvent bath may be applied in a subsequent step at position 40. For instance, a further non-solvent bath may be water or another appropriate non-solvent. However, it is also possible to omit position 40.

If a pore former of any kind is added to the casting suspension on the raw electrode layer 100, this pore former could be removed in a subsequent bath 50. If required, a suspension of hydrophobic particles, for instance polytetrafluoroethylene (PTFE), may be sprayed at least on one side of the resulting electrode structure at position 60. Finally, a final wash bath 70 may be applied to the electrode structure before resulting a gas diffusion electrode can be rolled up at position 90.

In this way a process for a continuously producing of a gas diffusion electrode can be achieved. This allows a very fast production of high-quality gas diffusion electrodes in a process which requires only low production costs. Since the gas diffusion electrode is based on a very thin electrically non-conducting reinforcement web 110, a very robust gas diffusion electrode can be achieved having a minimal thickness.

Figure 3:
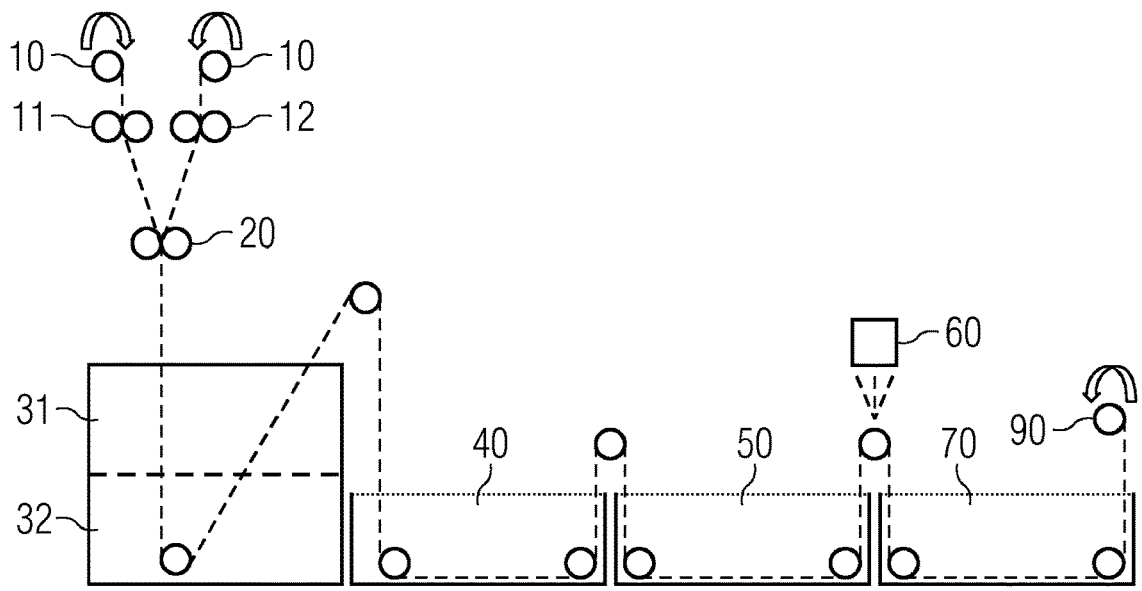
FIG. 3: schematically shows a process for producing a gas diffusion electrode incorporating teachings of the present disclosure.

FIG. 3 shows a schematically illustration for producing a gas diffusion electrode incorporating teachings of the present disclosure. As can be seen in this figure, two raw electrode layers 100 are provided by the roles 10. Accordingly, the thickness of each provided raw electrode layer 100 may be adapted individually by a pair of roles 11 and 12. In this embodiment, each raw electrode layer 100 may comprise an individual reinforcement web 110. Subsequently, the two (or more) raw electrode layers 100 are pressed together by a pair of roles 20 or another appropriate device for combining the individual raw electrode layers 100. Next, the combination of the individual raw electrode layers is subjected to one or more non-solvents as already described in connection with FIG. 2. Hence, the process for producing gas diffusion electrode according to FIG. 3 mainly corresponds to the process as described in connection with FIG. 2.

Figure 4:
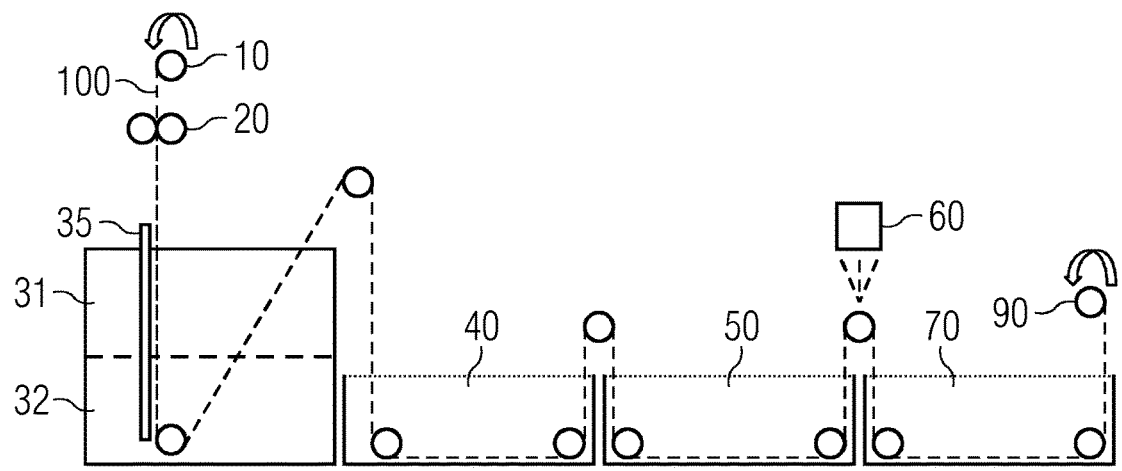
FIG. 4: schematically shows a process for producing a gas diffusion electrode incorporating teachings of the present disclosure.

FIG. 4 schematically shows a process for producing gas diffusion electrode incorporating teachings of the present disclosure. This embodiment mainly corresponds to the previously described embodiments, wherein an additional physical barrier 35 is arranged before at least one surface of the raw electrode layer 100. In this way, the impact of the non-solvents on the suspension of the raw electrode layer 100 may be adapted. If the physical barrier 35 is arranged very close to the surface of the raw electrode layer, no non-solvent or only a small amount of non-solvent is applied to a respective side of the raw electrode layer 100. By increasing the distance between the raw electrode layer 100 and the physical barrier 35, a higher amount of non-solvent can reach the respective surface of the raw electrode layer 100 and the impact of the non-solvent increases.

Even though only a single physical barrier 35 is shown at one side of the raw electrode layer 100, it may be also possible to arrange physical barriers on both sides of the raw electrode layer 100. For instance, a first physical barrier 35 may be applied on one side of the raw electrode layer 100 when applying a first non-solvent, and a second physical barrier may be applied to the other side of the raw electrode layer when applying another non-solvent.

The remaining steps, in particular the additional optional steps of producing a gas diffusion electrode as already described in connection with FIG. 2, may be also applied in this embodiment any of the other described embodiments.

Figure 5:
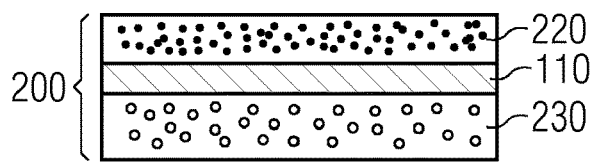
FIG. 5 schematically shows a cross-section of a gas diffusion electrode incorporating teachings of the present disclosure.

FIG. 5 shows a cross-section through a resulting gas diffusion electrode 200 incorporating teachings of the present disclosure. As can be seen, the resulting gas diffusion electrode comprises the electrically non-conducting reinforcement web 110. Furthermore, porous structures 220 and 230 are arranged on the reinforcement web 110. Even though a same porous structure may be formed on both sides of the reinforcement web 110, it is also possible that the gas diffusion electrode 200 comprises different porous structures 220 and 230 on the individual sides of the reinforcement web 110. For instance, electrically conducting particles may be arranged on a first side of the reinforcement web 110 to form an active layer. Furthermore, particles of a hydrophobic material may be applied to one side of the reinforcement web 110. Furthermore, any appropriate configuration of a gas diffusion electrode comprising an electrically non-conducting reinforcement web 110 may also be possible. It may also be possible that more than one layer of different particles may be arranged on a same side of the reinforcement web 110 to form different functional layers.

Figure 6:
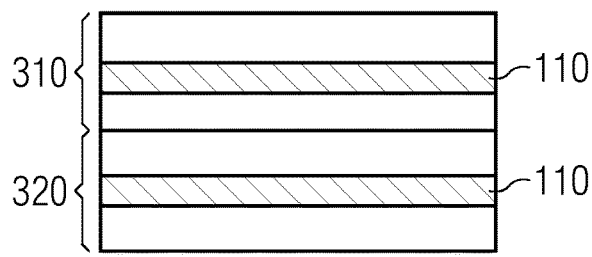
FIG. 6 schematically shows a cross-section of a gas diffusion electrode incorporating teachings of the present disclosure.

FIG. 6 schematically shows a further configuration of a gas diffusion electrode incorporating teachings of the present disclosure. As can be seen in this figure, the gas diffusion electrode comprises at least two structures, each comprising an individual reinforcement web 110. In this configuration, multiple raw electrode layers are combined as described in connection with FIG. 3. Accordingly, the resulting gas diffusion electrode 300 comprises multiple layers 310, 320, each layer 310, 320 having particles of an individual material.

Figure 7:
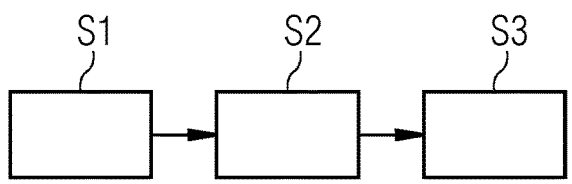
FIG. 7 schematically shows a flowchart underlying a method for producing a gas diffusion electrode incorporating teachings of the present disclosure.

FIG. 7 schematically shows a flowchart of a method for producing a gas diffusion electrode incorporating teachings of the present disclosure. In step S1, at least one raw electrode layer 100 is provided. Each raw electrode layer 100 comprises an electrically non-conducting reinforcement web 110. In particular, the electrically non-conducting reinforcement web 110 may be formed by a mesh of a polymer, for instance polypropylene, polyphenylene sulfide, nylon or another appropriate polymer. It is the way, a reinforcement web 110 having only a small thickness of less than 200 micrometers; in particular less than 149 micrometers, less than 100 micrometers or even less than 50, 20 or 10 micrometers can be achieved.

In step S2, the thickness of the raw electrode layer 100 is adapted. For instance, the raw electrode layer 100 may be fed to a slit having a predetermined width or to a pair of roles having a predetermined distance. Further, in step S3, at least one non-solvent is applied to the raw electrode layer 100. If necessary, two or more steps of applying a non-solvent may be also possible. For instance, a first non-solvent may be applied by the volume of a steam or by spraying a liquid non-solvent on a surface of the raw electrode layer 100. Furthermore, a bath of an appropriate non-solvent may also be applied. In this way, a phase inversion can be achieved and a porous structure of the casting of the raw electrode layer is obtained.

Summarizing, the present disclosure describes methods for producing a gas diffusion electrode. In some embodiments, processes for a continuous producing of gas diffusion electrodes having a reduced thickness is provided. For this purpose, an electrically non-conducting reinforcement web is used as a basis for applying particles on this reinforcement web. In particular, the reinforcement web may comprise a mesh of a polymer such as polypropylene, polyphenylene sulfide, nylon or another organic polymer. In this way, very robust and thin gas diffusion electrodes can be achieved by a continuous manufacturing process.

What is claimed is:

1. A method for producing an element for a gas diffusion electrode, the method comprising:
   providing a raw electrode layer comprising an electrically non-conducting web;
   adapting a thickness of the raw electrode layer;
   feeding the raw electrode layer vertically; and
   applying a non-solvent to the raw electrode layer during the vertical feeding.

2. The method according to claim 1, wherein the electrically non-conducting web comprises an organic polymer.

3. The method according to claim 1, wherein a thickness of the electrically non-conducting web is less than 149 micrometers.

4. The method according to claim 1, wherein the raw electrode layer comprises particles of an electrode material suspended in a binder.

5. The method according to claim 1, wherein applying a non-solvent to the raw electrode layer comprises applying a first non-solvent in a closed volume steam and/or spraying the first non-solvent on a surface of the raw-electrode layer.

6. The method according to claim 1, wherein applying a non-solvent to the raw electrode layer comprises applying a second non-solvent in a non-solvent bath.

7. The method according to claim 1, wherein providing a raw electrode layer comprises:
   providing a first raw electrode layer and a second raw electrode layer; and
   pressing together the first raw electrode layer and the second raw electrode layer.

8. The method according to claim 7, wherein the first raw electrode layer and the second raw electrode layer each comprise an electrically non-conducting web.

9. The method according to claim 1, further comprising placing a physical barrier in front of a surface of the raw electrode layer before applying the non-solvent to the raw electrode layer.

10. The method according to claim 9, further comprising controlling a distance between the physical barrier and the surface of the raw electrode layer.

* * * * *